United States Patent Office 3,517,767
Patented June 30, 1970

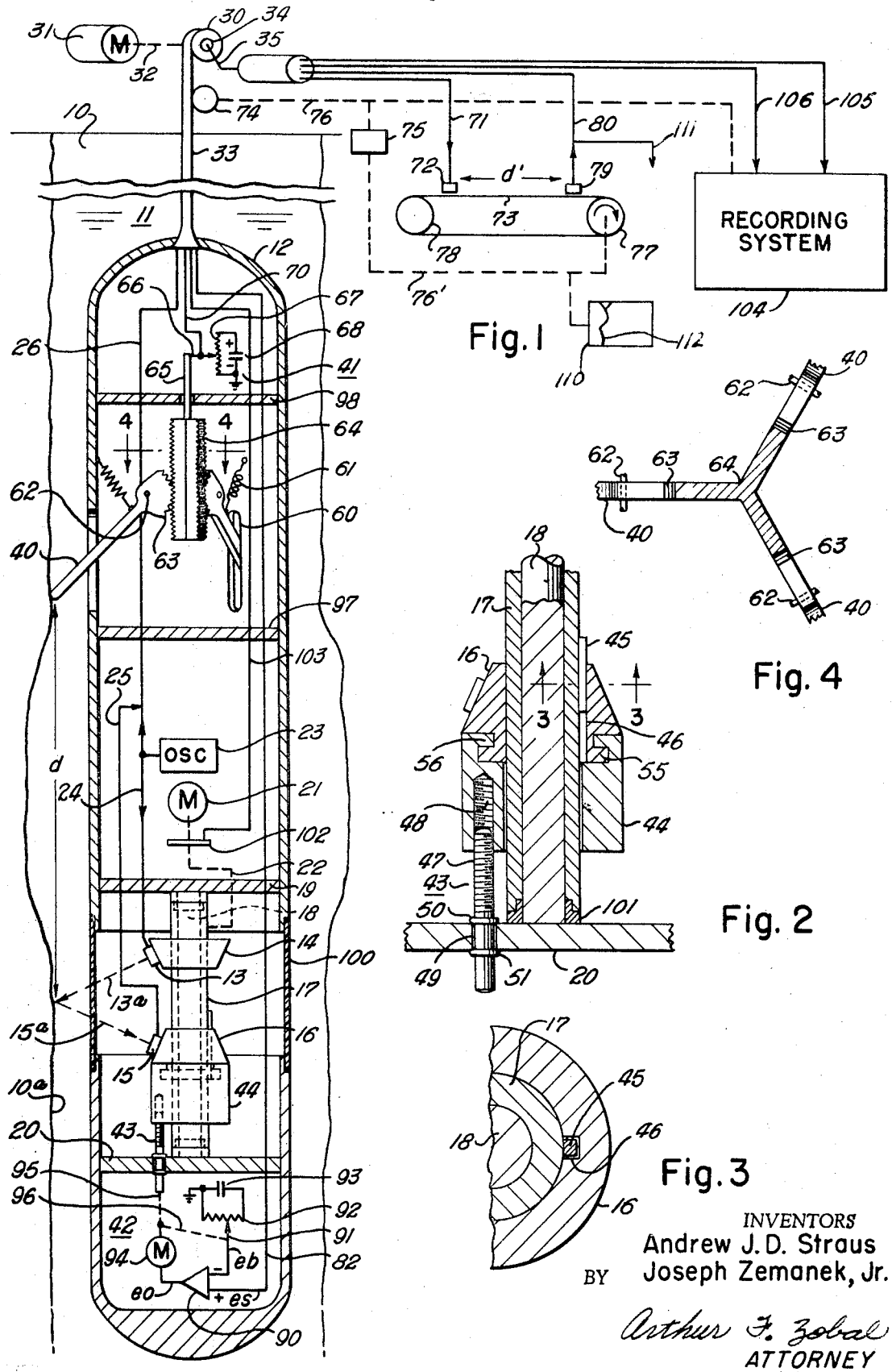

3,517,767
CALIPER SYSTEM FOR FOCUSING DUAL TRANSDUCERS IN LOGGING TOOL
Andrew J. D. Straus and Joseph Zemanek, Jr., Dallas, Tex., assignors to Mobil Oil Corporation, a corporation of New York
Filed Apr. 4, 1969, Ser. No. 813,431
Int. Cl. G01v 1/40
U.S. Cl. 181—.5        8 Claims

ABSTRACT OF THE DISCLOSURE

The specification discloses a transducer assembly supported for rotation in a borehole tool and including a directional acoustic transmitter and a directionally sensitive receiver spaced from each other and operated respectively to transmit acoustic pulses to the borehole wall and to detect reflected acoustic energy. Caliper means coupled to the tool is provided for sensing variations in the cross-sectional size of the borehole. Means coupled to the caliper means and to a focusing means actuates the focusing means for varying the relationship between the transducers in accordance with variations in the cross-sectional size of the borehole to enhance the detection of reflected energy as the cross-sectional size of the borehole varies.

BACKGROUND OF THE INVENTION

This invention relates to a focusing system in a borehole logging tool operated by a downhole caliper system to vary the focus of a transmitter and separate receiver employed in the tool for carrying out logging operations.

In U.S. Pat. No. 3,369,626, issued to Joseph Zemanek, Jr., on Feb. 20, 1968, entitled Methods of and Apparatus for Producing a Visual Record of Physical Conditions of Materials Traversed by a Borehole, there is disclosed an acoustic borehole logging system for scanning the walls of the borehole periodically with acoustic energy for obtaining information of interest. In one embodiment, the scanning operations are carried out with an acoustic transmitter and a separate receiver which are rotated in the borehole tool. During rotation, the transmitter is periodically actuated to produce acoustic pulses which are applied to the borehole wall. Reflected energy is detected by the receiver between acoustic pulses and converted into signals which are recorded to obtain the desired information.

In U.S. patent application Ser. No. 756,8805, filed Sept. 3, 1968, by Andrew J. D. Straus, entitled Focusing System for Dual Transducer Logging Tool, and assigned to the same assignee as the present application, there is disclosed a focusing system for focusing the transmitter and receiver as the borehole size varies whereby the maximum amplitude signal reflected from the borehole wall may be detected. In the specific embodiment disclosed, the focusing means is controlled from the surface by an operator who monitors the received signal displayed on an uphole scope.

SUMMARY OF THE INVENTION

In accordance with the present invention there is provided, in a logging tool containing an energy transmitter and a spaced receiver, a caliper system coupled to the tool for controlling a focusing means for focusing the transmitter and receiver. The caliper system senses variations in the cross-sectional size of the borehole, while the focusing means is employed to vary the relationship between the transmitter and receiver. Means coupled to the caliper system and to the focusing means is employed for actuating the focusing means for varying the relationship between the transmitter and receiver to enhance the detection of reflected energy as the cross-sectional size of the borehole varies. The present invention has advantages in that it allows focusing to be carried out while the tool is being moved continuously through the borehole and the transmitter and receiver are being rotated and operated for scanning purposes.

In the embodiment disclosed, the caliper system comprises caliper arms coupled to the tool for sensing the variations in the radius of the borehole. The focusing means is adapted to vary the spacing between the transmitter and receiver to decrease the spacing as the radius of the borehole decreases and to increase the spacing as the radius of the borehole increases.

In a more specific aspect, the caliper arms are coupled to the tool at a position spaced from the transmitter and receiver. The tool is moved along the borehole in a direction to cause the caliper arms to sense variations of the borehole radius prior ot the arrival of the transmitter and receiver. The caliper arms control a device which produces a voltage which varies in accordance with the variations of the borehole size. This voltage is delayed and then applied back to control the focusing means whereby focusing is delayed until the transmitter and receiver arrive at the level in the borehole where the caliper arms had previously sensed for borehole size variations.

BRIEF DESCRIPTION OF THE DRAWINGS

FIG. 1 illustrates the present invention in a borehole logging system;

FIG. 2 is an enlarged cross-sectional view of a portion of the borehole system of FIG. 1;

FIG. 3 is a cross-sectional view of FIG. 2 taken along the lines 3—3; and

FIG. 4 is an enlarged cross-sectional view of FIG. 1 taken along the lines 4—4.

DESCRIPTION OF THE LOGGING SYSTEM

Referring now to FIG. 1, there will be described briefly the borehole logging system employed for carrying out logging operations in a borehole illustrated at 10 and containing borehole fluid 11. The borehole system comprises a borehole tool 12 having an acoustic transmitter 13 secured to mount 14 and an acoustic receiver 15 secured to mount 16. The transmitter and receiver mounts 14 and 15 are secured to sleeve 17 which is rotated about mandrel 18 in order to rotate the transmitter and receiver about the tool axis in order to carry out scanning operations. Mandrel 18 is rigidly attached to supports 19 and 20, and rotation of the sleeve 17 is carried out by motor 21 and mechanical drive illustrated at 22 described in detail in U.S. Pat. No. 3,378,097 which was issued Apr. 16, 1968, to Andrew J. D. Straus et al. and entitled Transducer Rotating Mechanism for Borehole Logging Tools. During each cycle of rotation, oscillator 23, which is coupled to the transmitter 13 by way of conductor 24 and slip rings (not shown), periodically actuates the transmitter for the production of acoustic pulses at a rate of about 2,000 pulses per second. These pulses are transmitted to the borehole wall 10a by way of a narrow path, illustrated at 13a, through the borehole fluid 11. Between transmitted acoustic pulses, reflected energy, reflected along a path illustrated at 15a, is detected by the receiver 15 which is a directionally sensitive receiver. The resulting receiver signals are applied by way of slip rings (not shown) to conductor 25 from which they are applied to cable conductor 26 for transmission to the surface. Simultaneously with the actuation of transmitter 13, oscillator 23 produces sync pulses which are also applied to the surface by way of cable conductor 26.

During logging operations, drum 30 driven by motor 31 and connection 32 winds and unwinds the supporting cable 33 to move the tool 12 continuously through the borehole. At the surface, the various pulses and signals are taken from the cable conductors by way of slip rings and brushes illustrated, respectively, at 34 and 35.

DESCRIPTION OF THE PREFERRED EMBODIMENT

Focusing of the transmitter 13 and receiver 15 is controlled by three caliper arms 40 spaced 120° around the tool 12 and which sense for variations in the radius of the borehole as the tool 12 is pulled upward through the bore hole 10. These arms 40 control a potentiometer 41 which generates a voltage which varies in magnitude in accordance with the variation of the radius of the borehole. This voltage is applied to control a balancing system 42 which rotates threaded member 43 clockwise or counterclockwise in order to move control member 44 and mount 16 away from or toward mount 14 for focusing purposes. Mount 14 is rigidly secured to sleeve 17 and only mount 16 is moved to focus the system.

As the borehole diameter increases, mount 16 and hence receiver 15 are moved away from mount 14 and hence transmitter 13, until the path 15a of the reflected beam of acoustic energy in the plane formed by the transmitter, receiver, and point of reflection, extends toward the receiver 15. At this position, the receiver 15 will detect the maximum amplitude reflected signal within its operating plane. If the borehole diameter decreases, mount 16 and hence receiver 15 are moved toward transmitter 13 to refocus the system.

The focusing arrangement is constructed to allow focusing to be carried out while the transmitter 13 and receiver 15 are being rotated for scanning purposes. In this respect, member 44 is coupled to mount 16 and moves the mount in the axial direction of the sleeve 17 for focusing purposes. Member 44 is prevented from rotating; however, the coupling arrangement allows mount 16 to rotate with sleeve 17 when the mount 16 is being moved axially by member 44 for focusing purposes.

Referring to FIGS. 2 and 3, the focusing arrangement will be described in detail. Sleeve 17 has an elongated key 45 secured to its exterior diameter. This key fits into elongated slot 46 formed in mount 16 and hence causes mount 16 to rotate wtih the sleeve 17 but allows mount 16 to slide along the sleeve in the axial direction. Member 44 is supported for movement along sleeve 17 in its axial direction but is prevented from rotating by member 43. This member has one end 47 threaded into aperture 48 formed in the lower end of member 44 and a second end supported for rotation within aperture 49 formed through support 20. Ridges 50 and 51, formed on member 43, prevent longitudinal movement of member 43 through the aperture 49. As the member 43 is rotated clockwise or counterclockwise, end 47 threads into or out of aperture 48 and hence moves member 44 away from or toward transmitter 13. The arrangement for coupling mount 16 to member 44 to allow member 44 to move the mount for focusing purposes comprises a flange 55 extending outwardly from the lower end of mount 16 and which interlocks with flange 56 extending radially inwardly from the upper end of member 44. As member 44 moves mount 16 toward or away from transmitter 13, sleeve 17 may rotate within member 44 while flange 55 of mount 16 may rotate within flange 56. Thus, sleeve 17 and hence mount 16 are allowed to rotate while focusing is being carried out.

Since the arms 40 (see FIG. 1) sense the borehole size variations as the tool 12 is moved through the borehole, focusing is carried out continuously while logging. These arms 40 extend through slots 60 and are biased outwardly by spring members illustrated at 61 to maintain contact with the borehole wall. Their inner ends are pivotally supported to the tool structure by support illustrated at 62. Also coupled to the inner ends of the arms are arcuate-shaped gears 63 which mesh with the teeth of the Y-shaped arms of a rack 64, also illustrated in FIG. 4. This rack is coupled by extension 65 to potentiometer arm 66. As the caliper arms 40 move inward or outward, they move the rack 64 upward or downward and hence move the potentiometer arm 66 along the potentiometer coil 67 which is energized by battery illustrated at 68. Thus, a varying voltage is generated. This voltage represents the average changes in the borehole size at each level since the rack and gear arrangement allows the caliper arms to move inward or outward only when the borehole size changes the same amount in the vicinity of each arm. In other words, the caliper arms cannot move independently of each other but do move together as the average or general shape of the borehole.

In the embodiment disclosed, the caliper arms 40 are spaced a distance $d$ from the transmitter and receiver; and the tool 12 is pulled upward during logging operations whereby the caliper arms sense the borehole size variations prior to the arrival of the transmitter 13 and the receiver 15. The voltage from the potentiometer 41 is applied uphole by cable conductor 70. At the surface, the voltage is applied by conductor 71 to a recording head 72 which records the voltage on a continuous tape 73 driven at a speed proportional to the speed of the logging tool 12. The tape-driving arrangement comprises a reel 74 driven by cable 33, connection 76, a gear box 75, connection 76′, and drum 77 which unwinds the tape from drum 78. Spaced from the recording head 72 by a predetermined distance $d'$ is a pickup head 79. The distance $d'$ is proportional to the distance $d$. The tape 73 is driven at a speed such that caliper information, obtained at a given level in the borehole and recorded by head 72 on tape 73, will arrive at pickup head 79 at the same time that the transmitter-receiver system arrives at substantially the same level in the borehole. Pickup head 79 thus senses the signals recorded on tape 73 at a delayed time sufficient to allow the transmitter and receiver to arrive at the level in the borehole where the caliper arms had previously sensed for variations in the borehole radius. The delayed voltage from pickup head 79 is transmitted downhole to control balancing system 42 to move mount 16 toward and away from mount 14 at a delayed time whereby focusing is carried out at substantially the same time that the transmitter and receiver arrive at the level at which the arms 40 previously had sensed for radius variations as the tool 12 is moved upwardly through the borehole. Transmission of the voltage from pickup head 79 downhole is by way of conductor 80, slip ring and brush arrangement 34 and 35, and cable conductor 82.

The distance $d$ is measured from the midpoint between the transmitter and receiver and the midpoint between the uppermost and lowermost positions at which the caliper arms 40 may move. Although not shown, an erase head is provided to erase signals from tape 73 after they have been sensed by pickup head 79.

The balancing system 42 may comprise any conventional null-balancing system. The system disclosed comprises an operational amplifier 90 having two inputs, a positive input $e_s$ from cable conductor 82 and a negative input $e_b$ from a potentiometer comprising arm 91 and potentiometer coil 92 energized by battery 93. The output of amplifier 90 is applied to drive reversible motor 94 whose shaft 95 is coupled to member 43 to drive the member 53 clockwise or counterclockwise. Shaft 95 also is coupled to arm 91 by way of connection 96. If $e_s$ equals $e_b$, the output $e_o$ of the amplifier 90 is equal to zero and the motor 94 is not actuated. If, however, the voltage from conductor 82 varies such that $e_s$ is greater than $e_b$, $e_o$ is greater than zero. This resulting change in voltage drives the balancing motor 94 to cause it to rotate its shaft 95 in a direction to move arm 91 in a position to cause $e_b$ to equal $e_s$. As arm 91 is moved, shaft 95 also rotates member 43 to focus the transmitter-receiver system. If the voltage on conductor 82 changes such that $e_s$ is less than $e_b$, the balancing motor 94 is driven in an opposite direction to balance the system and to rotate the member 43 in an opposite direction.

In a further description of the borehole system, the zone in the tool 12 where the arms 40 are located is sealed from the remaining portion of the tool by members 97 and 98. The zone in the tool 12 where the transmitter and receiver are located is filled with oil for impedance matching purposes and pressure equalization. This zone is surrounded by a window comprising a rubber boot 100 coupled to the wall structure of the tool. The sleeve 17 is supported for rotation about mandrel 18 by bearing members illustrated at 101 in FIG. 2. The caliper arms 40 are constructed of material which is resilient enough to prevent their breakage but is rigid enough to cause the gears 63 to move the rack 64. Not shown are centering springs coupled to the exterior of the borehole tool for maintaining the tool in the center of the borehole.

Although the caliper arms are illustrated as spaced from the transmitter-receiver system, it is to be understood that they could be located at a position which is substantially at the level of the transmitter and receiver whereby the focusing delay mentioned above would not be necessary.

Also shown in the tool 12 is an orienting sensing device 102 which is rotated by the motor 21 to sense geographic direction as the motor 21 and hence the sleeve 17 are rotated in the borehole. As disclosed in U.S. Pat. No. 3,369,626, circuitry coupled to the orienting sensing device 102 produces an orienting signal each time the transmitter 13 and receiver 15 pass magnetic north. The orienting signal is transmitted to the surface by way of slip rings and brushes (not shown) and cable conductor 103. At the surface, the orienting signal is applied to a recording system 104 by way of conductor 105. The sync pulse and the receiver signal are applied to the recording signal by way of conductor 106. This system may also have elements driven in correlation with the position of the tool in the borehole by way of connection 76. In one embodiment, the recording system may comprise an oscilloscope and a camera which produces a record or display of the receiver signals and which display represents a folded-out section of the inside of the borehole wall as disclosed in U.S. Pat. No. 3,369,626.

In addition to the above, it is to be understood that the caliper information sensed by pickup head 79 may be recorded by a conventional strip chart recorder 110, which has its chart driven by connection 76', in correlation with the depth of the tool 12. The output from pickup head 79 is applied to recorder 110 by way of conductors 80 and 111. The trace 112 recorded gives additional information useful in interpreting the folded-out sections recorded by the recording system 104.

What is claimed is:

1. A borehole logging system comprising:
    a borehole tool for insertion into a borehole,
    a first transducer located in said tool for directionally transmitting an incident beam of energy to the borehole wall to cause a beam of energy to be reflected from said borehole wall,
    a second transducer located in said tool and spaced from said first transducer for detecting said beam of energy reflected from said borehole wall,
    sensing means for sensing variations in the cross-sectional size of said borehole,
    focusing means for varying the relationship between said transducers, and
    means coupled to said sensing means and to said focusing means for actuating said focusing means for varying the relationship between said transducers to enhance the detection of said reflected beam as the cross-sectional size of said borehole varies.

2. The system of claim 1 wherein:
    said sensing means comprises caliper arms coupled to said tool for sensing the variations in the radius of said borehole.

3. The system of claim 2 wherein:
    said focusing means is adapted to vary the spacing between said transducers to decrease said spacing as the radius of said borehole decreases and to increase said spacing as the radius of said borehole increases.

4. A borehole logging system comprising:
    an elongated borehole tool for insertion into a borehole,
    a first transducer located in said tool for directionally transmitting acoustic energy to the borehole wall to cause acoustic energy to be reflected from said borehole wall,
    means for periodically operating said first transducer for generating pulses of acoustic energy for transmission to said borehole wall,
    a second transducer located in said tool and spaced from said first transducer along the longitudinal axis of said tool for detecting acoustic energy reflected from said borehole wall,
    said second transducer being directionally sensitive to acoustic energy,
    means for rotating said first and second transducers simultaneously about the longitudinal axis of said tool to carry out the transmission and detection of acoustic energy around said borehole wall,
    sensing means for sensing variations in the cross-sectional size of said borehole,
    focusing means for varying the relationship between said transducers, and
    means coupled to said sensing means and to said focusing means for actuating said focusing means for varying the relationship between said transducers to enhance the detection of reflected acoustic energy as the cross-sectional size of said borehole varies.

5. The system of claim 4 wherein:
    said sensing means comprises caliper arms coupled to said tool for sensing the variations in the radius of said borehole,
    said focusing means being adapted to vary the spacing between said transducers to decrease said spacing as the radius of said borehole decreases and to increase said spacing as the radius of said borehole increases.

6. The system of claim 4 wherein:
    said sensing means comprises caliper arms coupled to said tool for sensing the variations in the radius of said borehole,
    said caliper arms being spaced from both of said transducers along the longitudinal axis of said tool, and
    means for moving said tool continuously along said borehole in a direction to position said caliper arms ahead of said transducers whereby said caliper arms sense the variations in the radius of said borehole at positions prior to the arrival of said transducers at the level of said positions,
    said last-named means coupled to said caliper arms and to said focusing means including delay means for delaying actuation of said focusing means whereby focusing is delayed until said transducers arrive at the level in said borehole where said caliper arms previously had sensed for variations in the radius of said borehole.

7. The system of claim 6 comprising:
    means coupled to said caliper arms for producing a voltage that varies in accordance with the variation of the radius of said borehole as said tool passes through said borehole,
    said delay means including:
        (a) a magnetic tape driven at a speed dependent upon the speed at which said tool is moved through said borehole,
        (b) a recording head for recording said voltage on said tape, and (c) a pickup head spaced from said recording head for sensing said recorded voltage at a delayed time, said focusing means including means coupled to one of said transducers for moving said one transducer toward and away from the other of said transducers, and a balancing motor system controlled by said voltage sensed by said pickup head for actuating said focusing means for varying the spacing between said transducers.

8. The system of claim 5 comprising:

means coupled to said caliper arms for producing a voltage which varies in accordance with the variation of the radius of said borehole as said tool passes through said borehole, and means for recording said voltage in correlation with the depth of said tool in said borehole.

References Cited

UNITED STATES PATENTS 3,434,563    3/1969    Zemanek _____ 181—0.5

RODNEY D. BENNETT, Primary Examiner

D. C. KAUFMAN, Assistant Examiner

U.S. Cl. X.R.

340—18

Case 7190

PO-1050
(5/69)

UNITED STATES PATENT OFFICE
CERTIFICATE OF CORRECTION

Patent No. 3,517,767          Dated June 30, 1970

Inventor(s) Andrew J. D. Straus and Joseph Zemanek, Jr.

It is certified that error appears in the above-identified patent and that said Letters Patent are hereby corrected as shown below:

Column 1, line 48, Ser. No. "756,8805" should be --756,805--.
Column 2, line 18, "ot" should be --to--.
Column 3, line 10, "bore hole" should be --borehole--;
          line 43, "wtih" should be --with--;
          line 72, "support" should be --supports--.
Column 4, line 13, after "borehole" and before the period (.) insert --varies--;
          line 64, "member 53" should be --member 43--.

SIGNED AND
SEALED

SEP 29 1970

(SEAL)
Attest:

Edward M. Fletcher, Jr.
Attesting Officer

WILLIAM E. SCHUYLER, JR.
Commissioner of Patents

Case 7190

PO-1050
(5/69)

UNITED STATES PATENT OFFICE
CERTIFICATE OF CORRECTION

Patent No. 3,517,767　　　　　　　　Dated　June 30, 1970

Inventor(s) Andrew J. D. Straus and Joseph Zemanek, Jr.

It is certified that error appears in the above-identified patent and that said Letters Patent are hereby corrected as shown below:

```
Column 1, line 48, Ser. No. "756,8805" should be --756,805--.
Column 2, line 18, "ot" should be --to--.
Column 3, line 10, "bore hole" should be --borehole--;
          line 43, "wtih" should be --with--;
          line 72, "support" should be --supports--.
Column 4, line 13, after "borehole" and before the period (.)
                   insert --varies--;
          line 64, "member 53" should be --member 43--.
```

SIGNED AND
SEALED

SEP 29 1970

(SEAL)
Attest:

Edward M. Fletcher, Jr.
Attesting Officer

WILLIAM E. SCHUYLER, JR.
Commissioner of Patents